United States Patent
Hamilton et al.

[11] Patent Number: 6,099,940
[45] Date of Patent: Aug. 8, 2000

[54] SELECTIVELY-ACTIVATIBLE THREE-DIMENSIONAL SHEET MATERIAL HAVING MULTI-STAGE PROGRESSIVE ACTIVATION TO DELIVER A SUBSTANCE TO A TARGET SURFACE

[75] Inventors: Peter Worthington Hamilton, Cincinnati; Kenneth Stephen McGuire, Wyoming, both of Ohio

[73] Assignee: The Procter & Gamble Company, Cincinnati, Ohio

[21] Appl. No.: 08/895,123

[22] Filed: Jul. 16, 1997

[51] Int. Cl.[7] .................................. B32B 1/00; B32B 7/12
[52] U.S. Cl. ........................ 428/178; 428/172; 428/173; 428/212; 428/343; 156/196; 156/209; 156/295
[58] Field of Search ................................ 428/156, 172, 428/353, 354, 120, 178, 174, 173, 201, 212, 343; 156/145, 196, 209, 290, 291, 292, 295; 264/167, 284

[56] References Cited

U.S. PATENT DOCUMENTS

| | | | |
|---|---|---|---|
| 2,338,749 | 1/1944 | Wilbur | 24/67 |
| 2,861,006 | 11/1958 | Salditt | 117/7 |
| 3,018,015 | 1/1962 | Agriss et al. | 217/53 |
| 3,312,005 | 4/1967 | McElroy | 40/2 |
| 3,386,846 | 6/1968 | Lones | 117/11 |
| 3,396,894 | 8/1968 | Ellis | 228/56 |
| 3,554,835 | 1/1971 | Morgan | 156/234 |
| 3,592,722 | 7/1971 | Morgan | 161/148 |
| 3,853,129 | 12/1974 | Kozak | 128/287 |
| 3,901,237 | 8/1975 | Cepuritis et al. | 128/284 |

(List continued on next page.)

FOREIGN PATENT DOCUMENTS

| | | |
|---|---|---|
| 570960 | 12/1961 | Belgium . |
| 0 037 101 A1 | 10/1981 | European Pat. Off. ........ B65D 77/20 |
| 0 623 332 A1 | 9/1994 | European Pat. Off. ........ A61F 13/15 |
| 0 621 082 A1 | 10/1994 | European Pat. Off. .......... B05C 1/08 |
| 1 315 903 | 4/1963 | France . |
| 1429312 | 2/1966 | France . |
| 3-002292 | 1/1991 | Japan ............................... A61F 13/56 |
| 07246216 | 9/1995 | Japan ............................... A61F 13/56 |
| 975783 | 11/1964 | United Kingdom . |
| 1069445 | 5/1967 | United Kingdom . |
| WO 92/00187 | 1/1992 | WIPO ............................. B32B 3/00 |
| WO 95/11945 | 5/1995 | WIPO ................................ C09J 7/02 |
| WO 95/31225 | 11/1995 | WIPO ............................. A61L 15/58 |
| WO 96/19173 | 6/1996 | WIPO ............................. A61F 13/46 |
| WO 96/41604 | 12/1996 | WIPO ............................. A61F 13/58 |
| WO 97/18276 | 5/1997 | WIPO ............................... C09J 7/02 |
| WO 98 21410 | 5/1998 | WIPO ............................ D21H 27/40 |

*Primary Examiner*—Donald Loney
*Attorney, Agent, or Firm*—Leonard W. Lewis; Jacobus C. Rasser

[57] ABSTRACT

The present invention provides a selectively-activatible sheet material for delivering a substance to a target surface. The sheet material comprises a three-dimensional sheet of material having a first side and a second side. The first side has a plurality of hollow protrusions extending outwardly therefrom and separated from one another by valleys, while the second side has a plurality of depressions corresponding with the hollow protrusions. A substance adheres to and partially fills a location protected from external contact comprising the valleys and/or depressions. The sheet material may be selectively activated by deforming the hollow protrusions to deliver the substance to a target surface. The three-dimensional structure includes hollow protrusions which are adapted to progressively activate in multiple discrete stages to effect multistage progressive delivery of the substance to the target surface. The present invention also provides selectively-activatible sheet materials which incorporate a three-dimensional structure adapted to progressively activate in response to increasing compressive force levels via tailoring of the geometrical shapes of respective hollow protrusions. The present invention also provides selectively-activatible sheet materials which incorporate a three-dimensional structure adapted to progressively activate in response to increasing levels of deformation via tailoring of the geometrical shapes of respective hollow protrusions.

20 Claims, 3 Drawing Sheets

U.S. PATENT DOCUMENTS

| | | | |
|---|---|---|---|
| 3,937,221 | 2/1976 | Tritsch | 128/287 |
| 3,943,609 | 3/1976 | Egan, Jr. | 24/73 |
| 3,967,624 | 7/1976 | Milnamow | 128/287 |
| 4,023,570 | 5/1977 | Chinai et al. | 128/290 R |
| 4,054,697 | 10/1977 | Reed et al. | 428/40 |
| 4,061,820 | 12/1977 | Magid et al. | 428/311 |
| 4,067,337 | 1/1978 | Ness | 128/287 |
| 4,181,752 | 1/1980 | Martens et al. | 427/54.1 |
| 4,273,889 | 6/1981 | Yamazaki et al. | 525/109 |
| 4,303,485 | 12/1981 | Levens | 204/159.24 |
| 4,336,804 | 6/1982 | Roeder | 128/290 R |
| 4,337,772 | 7/1982 | Roeder | 128/290 R |
| 4,342,314 | 8/1982 | Radel et al. | 128/287 |
| 4,376,440 | 3/1983 | Whitehead et al. | 604/387 |
| 4,392,897 | 7/1983 | Herrington | 156/66 |
| 4,397,905 | 8/1983 | Dettmer et al. | 428/180 |
| 4,410,130 | 10/1983 | Herrington | 383/62 |
| 4,460,634 | 7/1984 | Hasegawa | 428/124 |
| 4,508,256 | 4/1985 | Radel et al. | 228/152 |
| 4,509,908 | 4/1985 | Mullane, Jr. | 425/290 |
| 4,514,345 | 4/1985 | Johnson et al. | 264/22 |
| 4,519,095 | 5/1985 | Clayton | 383/86 |
| 4,528,239 | 7/1985 | Trokhan | 428/247 |
| 4,556,595 | 12/1985 | Ochi | 428/143 |
| 4,576,850 | 3/1986 | Martens | 428/156 |
| 4,578,069 | 3/1986 | Whitehead et al. | 604/370 |
| 4,587,152 | 5/1986 | Gleichenhagen et al. | 428/195 |
| 4,655,761 | 4/1987 | Grube et al. | 604/389 |
| 4,695,422 | 9/1987 | Curro et al. | 264/504 |
| 4,699,622 | 10/1987 | Toussant et al. | 604/389 |
| 4,743,242 | 5/1988 | Grube et al. | 604/389 |
| 4,778,644 | 10/1988 | Curro et al. | 264/557 |
| 4,839,216 | 6/1989 | Curro et al. | 428/134 |
| 4,894,275 | 1/1990 | Pelzer | 428/166 |
| 4,946,527 | 8/1990 | Battrell | 156/60 |
| 4,959,265 | 9/1990 | Wood et al. | 428/343 |
| 5,008,139 | 4/1991 | Ochi et al. | 428/40 |
| 5,080,957 | 1/1992 | Leseman et al. | 428/167 |
| 5,098,522 | 3/1992 | Smurkoski et al. | 162/358 |
| 5,141,790 | 8/1992 | Calhoun et al. | 428/40 |
| 5,176,939 | 1/1993 | Shepherd | 427/146 |
| 5,221,276 | 6/1993 | Battrell | 604/389 |
| 5,245,025 | 9/1993 | Trokhan et al. | 536/56 |
| 5,246,762 | 9/1993 | Nakamura | 428/172 |
| 5,269,776 | 12/1993 | Lancaster et al. | 604/387 |
| 5,273,805 | 12/1993 | Calhoun et al. | 428/156 |
| 5,275,588 | 1/1994 | Matsumoto et al. | 604/372 |
| 5,296,277 | 3/1994 | Wilson et al. | 428/40 |
| 5,324,279 | 6/1994 | Lancaster et al. | 604/391 |
| 5,342,344 | 8/1994 | Lancaster et al. | 604/387 |
| 5,344,693 | 9/1994 | Sanders | 428/167 |
| 5,453,296 | 9/1995 | Lauritzen et al. | 427/208.6 |
| 5,458,938 | 10/1995 | Nygard et al. | 428/40 |
| 5,487,929 | 1/1996 | Rusincovitch, Jr. et al. | 428/40 |
| 5,514,122 | 5/1996 | Morris et al. | 604/387 |
| 5,518,801 | 5/1996 | Chappell et al. | 428/152 |
| 5,527,112 | 6/1996 | Dais et al. | 383/211 |
| 5,575,747 | 11/1996 | Dais et al. | 493/213 |
| 5,585,178 | 12/1996 | Calhoun et al. | 428/343 |
| 5,589,246 | 12/1996 | Calhoun et al. | 428/120 |
| 5,662,758 | 9/1997 | Hamilton et al. | 156/221 |

SELECTIVELY-ACTIVATIBLE THREE-DIMENSIONAL SHEET MATERIAL HAVING MULTI-STAGE PROGRESSIVE ACTIVATION TO DELIVER A SUBSTANCE TO A TARGET SURFACE

FIELD OF THE INVENTION

The present invention relates to a sheet-like material which is formed to have three-dimensional surface features with spaces therein to contain a substance, and more particularly to such materials wherein the surface features prevent external surfaces from contacting the substance until forces exerted on the surface features cause them to deform and become substantially more two-dimensional. The present invention further relates to methods of making such sheet-like materials.

BACKGROUND OF THE INVENTION

Articles have been developed which are coated or impregnated with useful substances intended to be utilized when the article is contacted with a target surface. While there are advantages with having the substance present on or near the surface of such articles, there is often the drawback that the useful substance is unprotected and is subject to inadvertent contact before intended use. One broad category of such articles encompasses the area of tapes and labels.

In the art of tapes, labels, and other articles using pressure sensitive adhesive to adhere an adhesive coated surface to a target surface, there has been recognized the problem of premature sticking to the target surface. That is, before the adhesive coated surface can be properly positioned over a target surface, inadvertent contact of the adhesive with the target surface causes premature sticking at one or more locations, thereby inhibiting proper positioning. Premature sticking may also cause contamination or degradation of the adhesive prior to final positioning at the target surface.

One approach developed to overcome this problem provides a material with three-dimensional non-deformable standoffs on a material surface, between which adhesive elements are located. Standoffs include any means extending outwardly from an adhesive surface which is contacted first before the adhesive surface is exposed to contact by another surface. While this approach has proven suitable for certain applications, such materials are commonly designed with many if not all of their protrusions at a uniform heights and spacing. Accordingly, engagement and deployment of such materials tends to be an "all or nothing" proposition in that control over the degree of engagement is difficult to achieve.

Another approach involves the use of sheet materials having deformable three-dimensional standoffs which deform to a substantially two-dimensional condition to deliver a substance to a target surface. While this approach has likewise proven suitable for certain applications, and because of its three-dimensional to two-dimensional functionality it is suitable for a wider range of applications than rigid standoffs, it is likewise commonly provided with many if not all of the protrusions at a uniform height and spacing. Accordingly, engagement and deployment of such materials tends to be an "all or nothing" proposition in that control over the degree of engagement is difficult to achieve.

Accordingly, it would be desirable to provide a three-dimensional sheet material with protrusions which are deformable to a substantially two-dimensional condition to deliver a substance to a target surface in progressive stages during activation by a user.

It would also be desirable to provide such a material which provides for multiple discrete activation levels for delivering a substance to a target surface.

It would further be desirable to provide such a material which provides for multiple discrete activation levels for progressively delivering multiple substances to a target surface.

SUMMARY OF THE INVENTION

The present invention provides a selectively-activatible sheet material for delivering a substance to a target surface. The sheet material comprises a three-dimensional sheet of material having a first side and a second side. The first side has a plurality of hollow protrusions extending outwardly therefrom and separated from one another by valleys, while the second side has a plurality of depressions corresponding with the hollow protrusions. A substance adheres to and partially fills a location protected from external contact comprising the valleys and/or depressions. The sheet material may be selectively activated by deforming the hollow protrusions to deliver the substance to a target surface. The three-dimensional structure includes hollow protrusions which are tailored to progressively activate in multiple discrete stages to effect multistage progressive delivery of the substance to the target surface.

The present invention also provides selectively-activatible sheet materials which incorporate a three-dimensional structure adapted to progressively activate in response to increasing compressive force levels via tailoring of the geometrical shapes of respective hollow protrusions. The present invention also provides selectively-activatible sheet materials which incorporate a three-dimensional structure adapted to progressively activate in response to increasing levels of deformation via tailoring of the geometrical shapes of respective hollow protrusions.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

As utilized herein, the term "selectively activatible" is used to refer to materials which exhibit substantially non-active properties when brought into contact with target surfaces until some action is taken by a user to "activate" the material to expose and deliver a substance. Accordingly, selectively-activatible properties differ from permanently-active strips of material which either maintain the substance in a permanently-deployed orientation or rely upon removal of liner materials (typically silicone-coated paper strips) or wrappings to expose the substance for use or removal from a protected space such as a rigid box or container.

Selective activation of such materials allows the user to properly position opposing surfaces before activation is accomplished, as well as minimizing the likelihood of contamination of the substance. This characteristic permits the material to be manipulated in any desired mode without encountering the difficulties of premature contact of the substance with itself or to other portions of the sheet material or target surface without the need for separate release sheets, liners, spacers, or the like.

Although materials in accordance with the present invention may be provided with two active sides or surfaces, if desired for particular applications, in accordance with the present invention it is presently preferred to provide such material with only one active side and one inactive or inert side. Under some circumstances it may be acceptable or desirable to design the sheet material so as to form an intermittent or discontinuous layer of substance on its active surface, while in other circumstances the sheet material be designed so as to exhibit a continuous layer of substance on its active side. For some applications it may also be desirable to provide multiple products on a single side of the material, deposited in discrete discontinuous cells or regions (e.g., co-dispensing epoxies, catalyzed reactions, etc.).

Various means of activation are envisioned as being within the scope of the present invention, such as: mechanical activation by compression, mechanical activation by tensile forces, and thermal activation. However, it is envisioned that there may be or be developed other means of activation which would trigger an activation of the material which would be capable of functioning as herein described. In a preferred embodiment the active side is activatible by an externally applied force exerted upon the sheet of material. The force may be an externally applied compressive force exerted in a direction substantially normal to the sheet of material, an externally applied tensile force exerted in a direction substantially parallel to the sheet of material, or a combination thereof One such material of current interest for use in accordance with the present invention comprises a three-dimensional, conformable web comprising an active substance on at least one surface protected from external contact by the three-dimensional surface topography of the base material. After activation, such materials form a substance delivery system which delivers the substance to the target surface. Such materials comprise a polymeric or other sheet material which is embossed/debossed to form a pattern of raised "dimples" on at least one surface which serve as stand-offs to prevent a substance therebetween or therein from contacting external surfaces until the stand-offs are deformed to render the structure more two-dimensional. Representative structures include those disclosed in commonly assigned, co-pending (allowed) U.S. patent application Ser. Nos. 08/584,638, filed Jan. 10, 1996 in the names of Hamilton and McGuire, entitled "Composite Material Releasably Sealable to a Target Surface When Pressed Thereagainst and Method of Making", 08/744,850, filed Nov. 8, 1996 in the names of Hamilton and McGuire entitled "Material Having A Substance Protected by Deformable Standoffs and Method of Making", 08/745,339, filed Nov. 8, 1996 in the names of McGuire, Tweddell, and Hamilton, entitled "Three-Dimensional, Nesting-Resistant Sheet Materials and Method and Apparatus for Making Same", 08/745,340, filed Nov. 8, 1996 in the names of Hamilton and McCiuire, "Improved Storage Wrap Materials", and [ ], Attorney's Docket No. 6719, filed Jun. 6, 1997 in the names of Hamilton, McGuire, Tweddell, and Otten, entitled "Selectively-Activatible Sheet Material For Dispensing and Dispersing a Substance Onto a Target Surface". The disclosures of each of these applications are hereby incorporated herein by reference.

The three-dimensional structure comprises a piece of deformable material which has a first side formed to have a plurality of hollow protrusions separated by valleys. The plurality of hollow protrusions have outermost ends. The piece of material his a second side. The second side has a plurality of depressions therein corresponding to the plurality of hollow protrusions on the first side. Preferably, the plurality of protrusions deform by modes which are selected from the group consisting of inverting, crushing, and elongating.

In one configuration, the substance adheres to and partially fills the depressions in the second side of the piece of material. In the limiting circumstance, the substance fills the depressions to a point at or slightly below the uppermost edge of the depressions, particularly if a meniscus is formed. The substance has a surface below the outermost edge of the plurality of depressions, so that when a portion of the second side of the piece of deformable material is placed against a target surface, the plurality of depressions prevents contact between the substance and the target surface until the portion is deformed at the target surface.

In an alternative configuration, the substance adheres to and partially fills the valleys between the plurality of hollow protrusions. In the limiting circumstance, the substance fills the valleys to a point at or slightly below the highest point of the protrusions, particularly if a meniscus is formed wherein the substance decreases in thickness with increasing distance from the surface of the protrusions. The substance has a surface below the outermost ends of the plurality of hollow protrusions, so that when a portion of the first side of the piece of deformable material is placed against a target surface, the plurality of hollow protrusions prevent contact between the substance and the target surface until the portion is deformed at the target surface.

FIGS. 1–5 illustrate a preferred embodiment of a material according to the present invention, which comprises a three-dimensional sheet-like structure generally indicated as 10. Material 10 includes a deformed material 12 having hollow protrusions 14 extending outwardly from the second side 11 of the material and a layer of substance 16 located within the depressions formed within hollow protrusions 14 on the first side 13 of the material. Protrusions 14 are preferably conical in shape with truncated or domed outermost ends 18. In the embodiment of FIGS. 1–5, protrusions 14 are equally spaced in an equilateral triangular pattern, all extending from the same side of the material. Preferably, the protrusions 14 have heights which are less than their diameters, so that when they deform, they deform by substantially inverting and/or crushing along an axis which is substantially perpendicular to a plane of the material. This protrusion shape and mode of deforming discourages protrusions 14 from folding over in a direction parallel to a plane of the material so that the protrusions cannot block substance within them from contact with a target surface.

Figure 1:
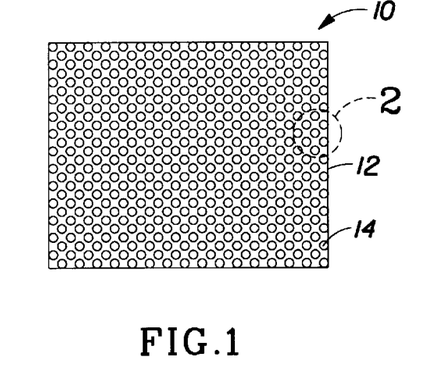
FIG. 1 is a plan view of a preferred embodiment of the present invention, disclosing a three-dimensional sheet of material having truncated conical protrusions.
Figure 2:
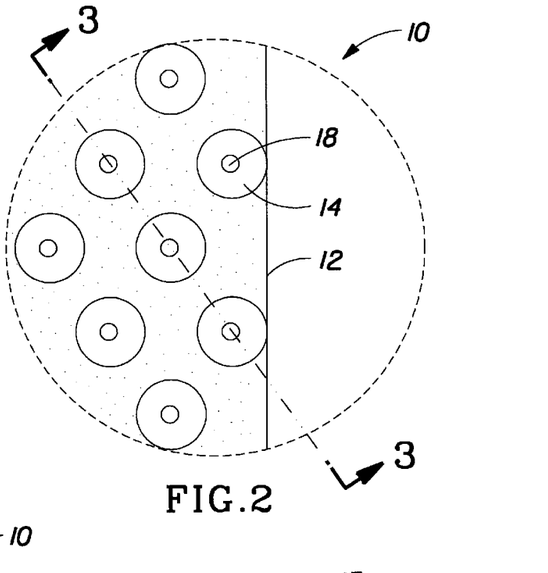
FIG. 2 is an enlarged partial plan view of the material of FIG. 1, showing an array of protrusions.
Figure 3:
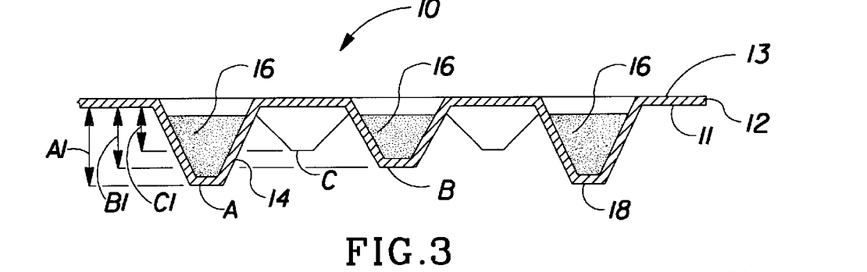
FIG. 3 is an elevational sectional view taken along section line 3—3 of FIG. 2, showing the three-dimensional structure of the sheet material and the location of the substance within the hollow protrusions.

While the sheet material 10 is constructed generally in accordance with the principles of the aforementioned Hamilton et al. applications, the features of the present invention are particularly apparent with reference to FIG. 3. In all embodiments of the present invention, the sheet material comprises a three-dimensional structure having outermost surface features and spaces between and/or within the outermost surface features for containing a substance having a level internal to the outermost surface features such that the substance is protected from inadvertent contact with external surfaces. The outermost surface features preferably comprise a plurality of hollow protrusions extending outwardly from a first side of the sheet material having corresponding depressions on the second side of the sheet material. In accordance with the present invention, the outermost surface features are adapted to progressively activate in multiple discrete stages to effect multi-stage progressive delivery of the substance to the target surface.

The sheet materials of the present invention may be tailored in many different ways to accomplish progressive activation. For example, sheet materials may incorporate a three-dimensional structure adapted to progressively activate in response to increasing compressive force levels via tailoring of the geometrical shapes of respective hollow protrusions, which may have a comparable level of substance within or between them. The sheet materials may also incorporate a three-dimensional structure adapted to progressively activate in response to increasing levels or degrees of deformation via tailoring of the geometrical shapes of respective hollow protrusions, such as providing protrusions of differing heights and/or having differing levels of substance within or between them.

FIG. 3 depicts the differential three-dimensional structure of the protrusions 14 which provides for multi-stage progressive activation to deliver the substance 16 to a target surface. The sheet material 10 of FIG. 3 includes a plurality of protrusions 14 having a plurality of (two or more) different geometrical three-dimensional heights measured from the second surface 11 of the sheet material 12 which forms the base of the protrusions. As shown in FIG. 3, the protrusion labelled "A" has a protrusion height "A1" measured from the common protrusion base in the plane of the sheet material 12. The protrusion labelled "B" has a protrusion height "B1" which is less than the height "A1", and the protrusion labelled "C" has a protrusion height "C1" which is less than the height "B1". As shown in FIG. 3, the substance 16 is preferably located a substantially uniform distance from the mouths of the depressions which themselves have a non-uniform depth. Sheet material 10 may include a plurality of protrusions having dimensional similarity to labelled protrusions A, B, and C, which may in turn be arranged in rows, columns, be intermingled with one another, or be located in any desired patterned or nonpatterned orientation with respect to one another.

Figure 4:
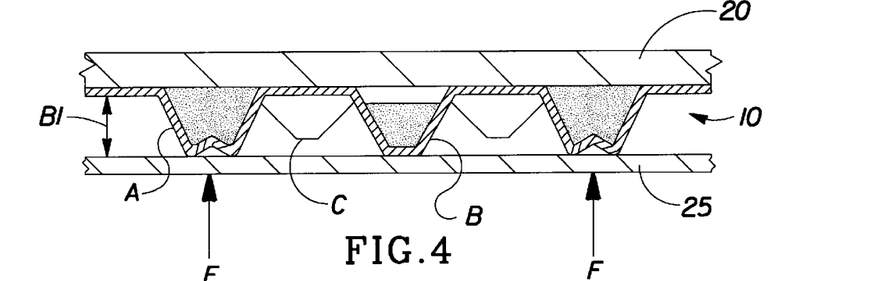
FIG. 4 is an elevational sectional view similar to FIG. 3, showing the effect of pressing the sheet material against a target surface, such that some of the protrusions deform by substantially inverting and/or crushing to allow the substance within the protrusions to contact the target surface.

FIG. 4 shows a target surface 20, which is smooth but which may have any surface topography, being placed in contact with the first surface of the sheet material 10 of FIG. 3. An opposing surface 25 is placed in contact with the second surface of the sheet material, the second surface comprising the distal ends 18 of a plurality of protrusions 14. Target surfaces in accordance with the present invention comprise any surface to which it is desired to apply the substance to be delivered. Opposing surfaces comprise any surface contacting the sheet material on a side opposite of the target surface and, in the case of a single-active-sided sheet material, the surface contacting the non-active side of the sheet material. FIG. 4 shows target surface 20 contacting layer of substance 16 after protrusions A having height A1 have been partially deformed under pressure applied to the non-substance side of material 12 by opposing surface 25, as indicated by force F. From the point of initial contact with protrusions having a height A1, the distance between the target and opposing surfaces has been reduced to the point where the protrusions A have been deformed sufficiently to permit the opposing surface to contact the outermost ends 18 of protrusions B having a height B1. At this point, the substance 16 in the protrusions A has been delivered to the target surface 20. Depending upon the physical properties of the substance, the substance may be deployed by the reduction in height of the protrusions, the reduction in volume accompanying the reduction in height of the protrusions, or any other cause and effect relationship occasioned by the reduction in three-dimensionality of the sheet material.

Figure 5:
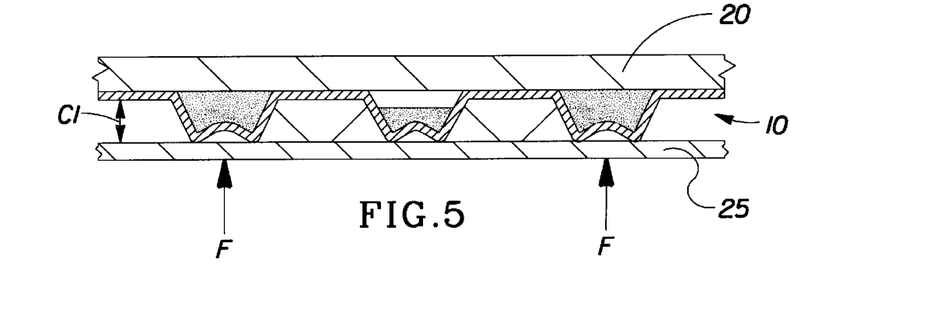
FIG. 5 is an elevational sectional view similar to FIG. 4, showing the effect of increased deformation of the sheet material such that additional protrusions deform to allow the substance within the protrusions to contact the target surface.

FIG. 5 depicts a further deformation of the sheet material 10 wherein the distance between the target surface 20 and the opposing surface 25 has been reduced to the point where the protrusions B have been deformed sufficiently to permit the opposing surface to contact the outermost ends 18 of protrusions C having a height C1. At this point, the substance 16 in the protrusions B has been delivered to the target surface after the substance 16 in the protrusions A has been delivered to the target surface 20. Continued progressive deformation of the sheet material in response to compressive forces caused by the continued approach of target and opposing surfaces will continue to progressively activate the sheet material and deliver substance int protrusions C and subsequent protrusions (if any) having smaller protrusion heights.

The external target or contact surface may be either compliant or rigid and planar or non-planar. However, in accordance with this aspect of the present invention the embodiment of FIGS. 3–5 is preferred for use with substantially rigid target and opposing surface. With regard to deformation-resistance (rigidity) of target and opposing surfaces, in the context of the present invention this terminology is utilized to refer to surfaces which maintain a radius of curvature which is substantially larger than the average protrusion height under the level of forces typically encountered. Contact surface rigidity may be influenced by not only the surface material itself but possibly by any backup materials, e.g., a very flexible material facially associated with a rigid backup material will exhibit a greater rigidity than that typically exhibited by the flexible material itself.

While the foregoing discussion of three-dimensional differences in the height of the protrusions to provide multi-stage progressive activation has been in the context of compressive force activation, it should be understood that the principles of the present invention are believed to be applicable to other modes of activation such as thermal and tensile activation, as the provision of protrusions of differing threedimensional heights is believed to likewise provide for progressive multi-stage activation in these activation modes as well. For example, it is believed that differences in protrusion height result in differing amounts of deformation required to deliver the substance; however, it is presently believed that the progressive activation would be provided in the opposite sense from that described above with regard to compressive activation. For example, in the instance of tensile or thermal activation it is believed that protrusions with a smaller protre on height would activate first to deliver their substance rather than the protrusions with a larger protrusion height in the case of compressive activation.

Figure 6:
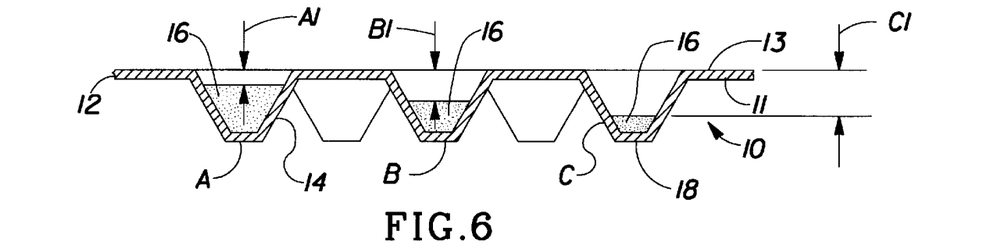
FIG. 6 is an elevational sectional view of another embodiment of a sheet material according to the present invention.
Figure 7:
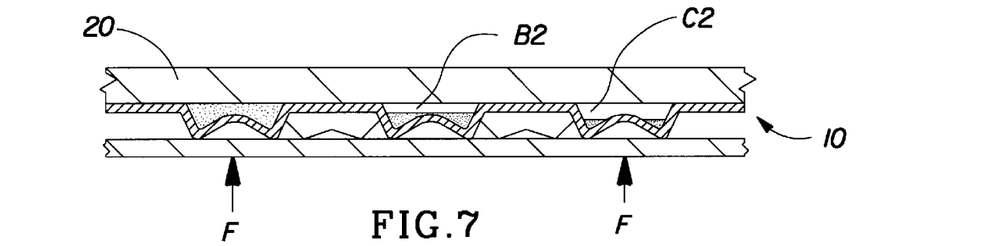
FIG. 7 is an elevational sectional view similar to FIG. 4, showing the effect of pressing the sheet material of FIG. 6 against a target surface, such that the protrusions deform by substantially inverting and/or crushing to allow the substance within some of the protrusions to contact the target surface.

FIGS. 6 and 7 depict another embodiment of the present invention. The sheet material 10 of FIGS. 6 and 7 is likewise constructed generally in accordance with the principles of the aforementioned Hamilton et al. applications, with the features of the present invention being particularly apparent with reference to FIG. 6.

FIG. 6 depicts the differential three-dimensional structure of the protrusions 14 which provides for multi-stage progressive activation to deliver the substance 16 to a target surface. The sheet material 10 of FIG. 6 includes a plurality of protrusions 14 having substantially uniform geometrical three-dimensional heights measured from the plane of the sheet material 12 which forms the base of the protrusions. As shown in FIG. 6, the protrusion labelled "A" has a substance clearance height "A1" measured from the mouth of the depression in the plane of the sheet material 12. The protrusion labelled "B" has a substance clearance height "B1" which is less than the height "A1", and the protrusion labelled "C" has a substance clearance height "C1" which is less than the height "B1". As shown in FIG. 6, the substance 16 is preferably located at substantially non-uniform distances from the mouths of the depressions which themselves have a substantially uniform depth. Sheet material 10 may include a plurality of protrusions having dimensional similarity to labelled protrusions A, B, and C, which may in turn be arranged in rows, columns, be intermingled with one another, or be located in any desired patterned or non-patterned orientation with respect to one another.

FIG. 7 shows a target surface 20, which is smooth but which may have any surface topography, being placed in contact with the first surface of the sheet material 10 of FIG. 6. An opposing surface 25 is placed in contact with the second surface of the sheet material, the second surface comprising the distal ends 18 of a plurality of protrusions 14. Target surfaces in accordance with the present invention comprise any surface to which it is desired to apply the substance to be delivered. FIG. 7 shows target surface 20 contacting layer of substance 16 after protrusions A having height A1 have been partially deformed under pressure applied to the non-substance side of material 12 by opposing surface 25, as indicated by force F. From the point of initial contact with protrusions having a substance clearance height A1, the distance between the target and opposing surfaces has been reduced to the point where the protrusions B have been deformed sufficiently to reduce the substance clearance height to a distance B2 which is less than B1 and the protrusions C have been deformed sufficiently to reduce the substance clearance height to a distance C2 which is less than C1. At this point, the substance 16 in the protrusions A has been delivered to the target surface 20. Depending upon the physical properties of the substance, the substance may be deployed by the reduction in height of the protrusions, the reduction in volume accompanying the reduction in height of the protrusions, or any other cause and effect relationship occasioned by the reduction in three-dimensionality of the sheet material.

In a manner similar to that depicted in FIGS. 4–5, continued progressive deformation of the sheet material in response to compressive forces caused by the continued approach of target and, opposing surfaces will continue to progressively activate the sheet material and deliver substance in protrusions B, C, and subsequent protrusions (if any) having greater initial substance clearance heights.

The external target or contact surface may be either compliant or rigid and planar or non-planar. However, in accordance with this aspect of the present invention the embodiment of FIGS. 6–7 is preferred for use with substantially rigid target and opposing surface. With regard to deformation-resistance (rigidity) of target and opposing surfaces, in the context of the present invention this terminology is utilized to refer to surfaces which maintain a radius of curvature which is substantially larger than the average protrusion height under the level of forces typically encountered.

Unlike the scenario when both the target and opposing surfaces are substantially rigid (non-conformable), the use of such sheet materials with conformable target and/or opposing surfaces differs in that the geometrical travel distances of the converging surfaces is no longer limited by the deformation-resistance of any one or more protrusions and may differ on a protrusion-by-protrusions basis. Such a scenario is also useful in conceptualizing the design of sheet materials useful in an application wherein three-dimensional protrusions may be deformed or activated individually/sequentially rather than concurrently.

Figure 8:
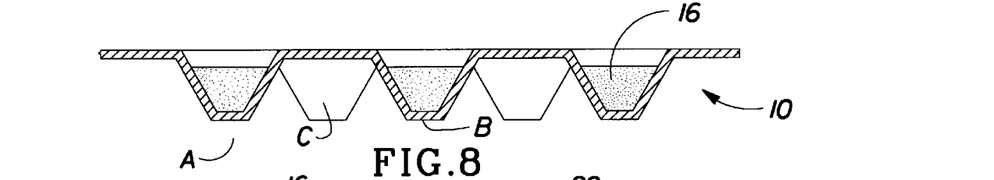
FIG. 8 is an elevational sectional view of another embodiment of a sheet material according to the present invention.

Accordingly, FIG. 8 depicts another embodiment of the present invention suitable for use with conformable target and/or opposing surfaces. The sheet material 10 is similar to that depicted in FIG. 6 in that the hollow protrusions 14 have substantially similar heights from the plane of the sheet material, but differs in that the substance 16 is placed within the depressions at a substantially constant distance from the second side of the sheet material. In accordance with the present invention, various protrusions exhibit a differing level of deformation-resistance. In the embodiment of FIG. 8, the protrusion labelled B exhibits a greater degree of deformation-resistance than the protrusion labelled A, and the protrusions labelled C exhibits a greater degree of deformation-resistance than the protrusion labelled B. Deformation-resistance of various respective protrusions may be tailored by selecting protrusions of differing geometrical cross-sectional shape (either parallel to the plane of the sheet material or normal to the plane of the sheet material), differing materials, differing protrusion wall thicknesses, differing material treatments (annealing, etc.), or any other means known in the art.

Figure 9:
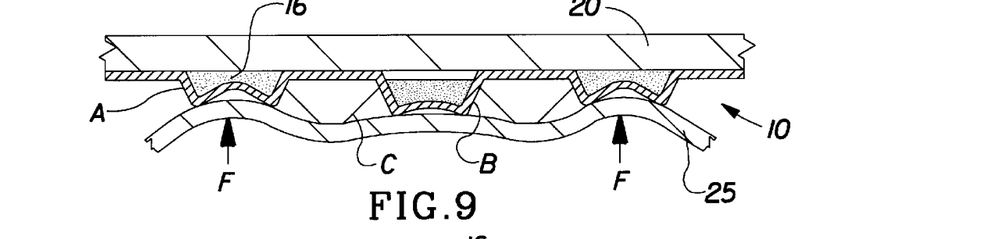
FIG. 9 is an elevational sectional view similar to FIG. 7, showing the effect of pressing the sheet material of FIG. 8 against a target surface, such that the protrusions deform by substantially inverting and/or crushing to allow the substance within some of the protrusions to contact the target surface.

FIG. 9 depicts the performance of the sheet material 10 of FIG. 8 when subjected to a compressive force by a conformable opposing surface 25 and a substantially rigid target surface 20. Note that the protrusion labelled A has deformed sufficiently to place the substance 16 located therein into contact with the target surface 20, while the protrusion labelled B exhibits a lesser degree of deformation which is insufficient to activate or deploy the substance 16 therein, and the protrusion labelled C has not yet begun to deform.

Figure 10:
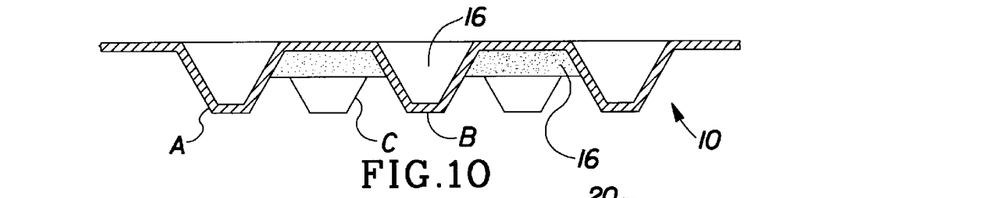
FIG. 10 is an elevational sectional view of another embodiment of a sheet material according to the present invention.

Unlike FIGS. 8 and 9, which depict a discontinuous substance 16 located within depressions defined by hollow protrusions 14, the embodiment of FIG. 10 illustrates a sheet material 10 similar in functionality to that of FIG. 8 but employing an interconnected continuous layer of substance 16 located in the valleys between protrusions 14 on the first side of the sheet material 10. In accordance with the present invention, various protrusions exhibit a differing level of deformation-resistance. In the embodiment of FIG. 10, the protrusion labelled B exhibits a greater degree of deformation-resistance than the protrusion labelled A, and the protrusions labelled C exhibits a greater degree of deformation-resistance than the protrusion labelled B. Deformation-resistance of various respective protrusions may be tailored by selecting protrusions of differing geometrical cross-sectional shape (either parallel to the plane of the sheet material or normal to the plane of the sheet material), differing materials, differing protrusion wall thicknesses, differing material treatments (annealing, etc.), or any other means known in the art.

Figure 11:
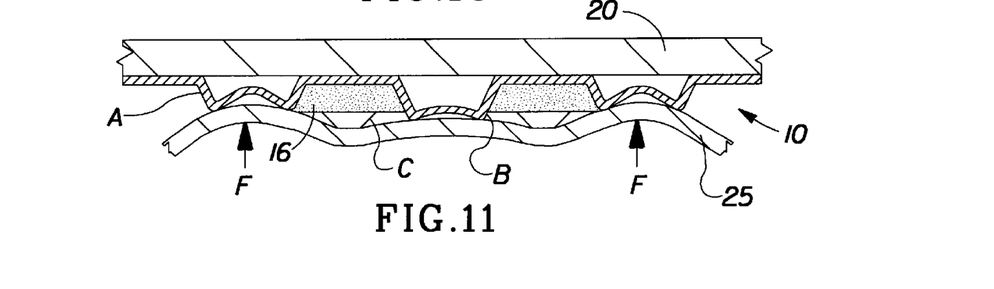
FIG. 11 is an elevational sectional view similar to FIG. 9, showing the effect of pressing the sheet material of FIG. 10 against a target surface, such that the protrusions deform by substantially inverting and/or crushing to allow the substance within some of the protrusions to contact the target surface.

FIG. 11 depicts the performance of the sheet material 10 of FIG. 10 when subjected to a compressive force by a conformable target surface 20 and a substantially rigid opposing surface 25. Note that the protrusion labelled A has deformed sufficiently to place the substance 16 located nearby into contact with the target surface 20, while the protrusion labelled B exhibits a lesser degree of deformation which is insufficient to activate or deploy the substance 16 nearby, and the protrusion labelled C has not yet begun to deform.

Figure 12:
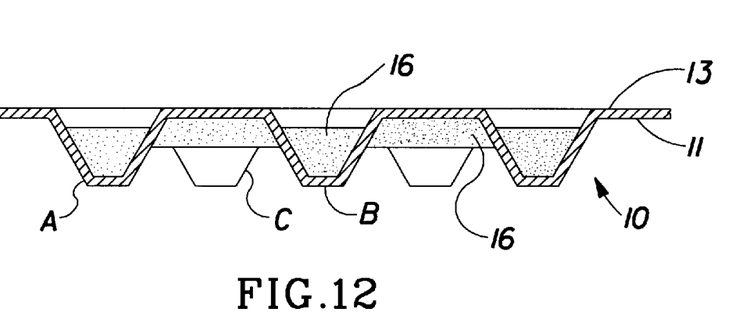
FIG. 12 is an elevational sectional view of yet another embodiment of a sheet material according to the present invention having two active sides.

While much of the foregoing discussion has focused upon sheet materials with a single active side and the other side being inactive, the present invention may also be employed in the construction of sheet materials having two active sides. FIG. 12 depicts one representative embodiment of a two-active-sided sheet material 10. In the embodiment of FIG. 12, the substance 16 is distributed in a continuous pattern upon the second surface 11 and discontinuously within the depressions 14 in the first surface 13. The embodiment of FIG. 12 represents a sheet material 10 having various protrusions exhibit a differing level of deformation-resistance as described above with respect to FIGS. 8–11.

Embodiments of the present invention may also incorporate more than one mode of differentiation between stages of activation. For example, protrusions which are geometrically tailored to provide for different activation stages via geometrical height (such as depicted in FIG. 3) may also incorporate other means of tailoring deformation resistance (such as cross-sectional shape tailoring as disclosed and described with respect to FIG. 8). One example of such a tailoring of activation properties would be to provide the later protrusions to deform (those labelled C in FIG. 3) with a greater deformation resistance than those which deform initially (those labelled A), such that a clear signal is relayed to the user via the increased activation force required to cross the boundary between sequential stages of activation.

The more protrusions per unit area, the thinner the piece of material and protrusion walls can be in order to resist a given deformation force. The size and spacing of protrusions may be selected to provide a continuous substance path surrounding protrusions (as shown in the embodiment of FIG. 10) so that a continuous pattern of the substance may be provided to a target surface, while also providing the optimum pattern of standoffs for selective activation.

Sheet materials utilized as a carrie material may be made from films comprising homogeneous resins or blends thereof Single or multiple layers within the film structure are contemplated, whether co-extruded, extrusion-coated, laminated or combined by other known means. The key attribute of the sheet material is that it be formable to produce protrusions and valleys. Useful resins include polyethylene, polypropylene, PET, PVC, PVDC, latex structures, nylon, etc. Polyolefins are generally preferred due to their lower cost and ease of forming. Other suitable materials include aluminum foil, coated (waxed, etc.) and uncoated paper, coated and uncoated nonwovens, scrims, meshes, wovens, nonwovens, and perforated or porous films, and combinations thereof Different applications for the selectively-activatible sheet material will dictate the ideal size and density of protrusions, as well as the selection of the substances used therewith. It is believed that the protrusion size, shape and spacing, the web material properties such as flexural modulus, material stiffness, material thickness, hardness, deflection temperature as well as the forming process determine the strength of the protrusion. A "threshold" protrusion stiffness is required to prevent premature activation of the sheet material due to the force of gravity or other forces, such as forces induced by shipping vibrations, mishandling, dropping and the like.

Inversion of protrusions minimizes protrusion spring back so that activation of the sheet material may be self-sustaining with little or no continuously-supplied forces. A resilient protrusion could be used, for example, where it is intended for the activation to be permanent, where aggressive adhesive overcomes spring back, or when the activation is intended to be momentary. Also, a resilient protrusion may be desirable where repeat use of the material is intended.

Protrusion shape has also been found to influence the stacking of material sheets or the rolling of material webs into rolls. If the same protrusion shape repeats over and over on the same spacing, for example, adjacent material sheets in a stack and adjacent layers in a roll tend to nest together, thereby negating the benefit of standoffs in protecting the substance internal to the standoffs. For situations where nesting is an issue, non-uniformly shaped or sized or spaced protrusions may be advantageous over a regular pattern of conical protrusions. Non-uniformly shaped or sized or spaced protrusions are disclosed in the aforementioned and incorporated McGuire et al. application.

In the present invention, the term "substance" can mean a flowable substance which is substantially non-flowing prior to delivery to a target, surface. "Substance" can also mean a material which doesn't flow at all, such as a fibrous or other interlocking material. "Substance" may mean a fluid or a solid. "Substance" is defined in this invention as any material capable of being held in open valleys and/or depressions of a three dimensional structure. Adhesives, electrostatics, mechanical interlocking, capillary attraction, surface adsorption, van der Waals forces, and friction, for example, may be used to hold the substances in the valleys and/or depressions. The substances may be permanently held in the valleys and/or depressions, or the substances may be intended to be released therefrom when exposed to contact with external surfaces or when the three dimensional structure is deformed, heated, or otherwise activated. Of current interest in the present invention include substances such as gels, pastes, foams, powders, agglomerated particles, prills, microencapsulated liquids, waxes, suspensions, liquids, and combinations thereof The spaces in the three dimensional structure of the present invention are normally open; therefore it is desirable to have substances stay in place and not run out of the structure without an activation step. The activation step of the present invention is preferably deformation of the three dimensional structure by compression. However, an activation step to cause substance to flow could be heating the material to above room temperature or cooling it below room temperature. Or it could include providing forces excessive of the earth's gravity. It could also include other deforming forces, such as tensile forces and combinations of these activation phenomena.

The term "deformable material" is intended to include foil polymer sheets, cloth, wovens or nonwovens, paper, cellulose fiber sheets, co-extrusions, laminates, and combinations thereof The properties of a selected deformable material can include, though are not restricted to, combinations or degrees of being: porous, nonporous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive.

The substance utilized in combination with the deformable material may exhibit a selection of physical properties which enable it to be dispensed from its protected orientation within the three-dimensional structure and applied to the target surface. Such dispensation may be partial, or substantially or totally complete in nature. Alternatively, the substance may be selected so as to remain associated with the sheet material during its deployment into contact with the target surface. One example of a substance intended to remain associated with the sheet material would be a layer of hot melt adhesive, specification no. Fuller HL-2115X, made by H. B. Fuller Co. of Vadnais Heights, Minn. Any adhesive can be used which suits the needs of the material application. Adhesives may be refastenable, releasable, permanent, or otherwise.

To facilitate the dispensing of substances intended to be liberated from the sheet material upon activation, substance properties which are believed to be important include the relative affinity of the substance for the target surface versus that for the deformable material and the apparent viscosity or flowability of the substance after activation of the three-dimensional structure. It is presently believed that the substance should preferentially adhere to the target surface to a greater extent than to the deformable material and/or to a greater extent than for other portions of the substance itself Said differently, the substance has a greater affinity for the target surface than for itself and/or for the deformable sheet material.

Substances intended to be liberated may inherently possess viscosity and flow characteristics which permit their liberation from their protected location within the sheet material or may require viscosity modification to permit liberation and dispersal. Viscosity modification may be obtained by the selection of substances which undergo a change in viscosity in response to the mode of activation selected. For example, for a mechanical activation such as a compressive force it may be desirable, and preferably, to employ substances which are commonly referred to as "shear-thinning" (pseudoplastic) substances. Examples of such substances include polymer solutions, many gels and pastes such as dentrifice and body creams, paints, gelled wood stains, etc. Other materials behave as shear-thinning materials only after a certain threshold shear stress (yield stress) is reached or exceeded. Such materials are commonly referred to as Bingham plastic materials, and one common example of a substance exhibiting such behavior is the type of condiment known as ketchup.

Some of the factors believed to influence the adhesion or affinity of the substance for the target surface include: electrostatic or electrical charges; chemical bonds via hydrogen bonding, covalent bonding, ionic bonding, partial ionic bonds (partial dipolar attraction), van der Walls forces, osmotic forces, etc.; capillary pressure (suction); adsorption; absorption; vacuum/suction; etc. Other important factors include the wettability of the substance upon the target surface, as reflected by the contact angle of the substance on the target surface.

To facilitate spreading or dispersal of the substance upon the target surface, particularly to counteract the tendency of the substance to remain in a localized distribution pattern given the localized orientation upon the deformable substance, it is presently preferred to utilize substances which are tailored so as to be wettable on the target surface. Other factors which may aid in dispersion or distribution of the substance upon the target surface include the use of substances which exhibit a shear-thinning behavior, as well as mechanical spreading action provided by the user of the composite sheet material to impart a lateral mechanical motion after activation but prior to removal of the deformable material from the target surface. Such lateral mechanical action may also provide additional interaction with the substance such as for shear-thinning substances and may provide additional benefits such as lathering, foam generation, scrubbing/abrasive action, etc.

As discussed above, a wide variety of substances may be selected for use in accordance with the principles of the present invention. Representative substances for illustrative purposes include cleansing agents such as soaps and detergents, emollients such as lotions, medicinal agents such as ointments, anti-inflammatory creams, etc., health and beauty care products, including antiperspirants, deodorants, cosmetics, fragrances, and the like. Other more diverse applications for such a sheet material include applicators for automotive and household products such as lubricants, colorants, protectants such as oils and waxes, adhesives, preservatives, and the like, as well as food-oriented applications such as condiments (mustard, ketchup, etc.).

Multiple substances may also be employed which are not only protected from inadvertent contact but segregated from one another initially (on the same face of, or on opposing faces of, the sheet material) and be commingled during the activation process or during subsequent dispensing and/or dispersion operations. Such an arrangement may be particularly useful for substances which beneficially interact with one another (e.g., co-dispensing epoxies, catalyzed reactions, etc.) to provide additional functionality with each other and/or with the target surface. Similar substances with different degrees of affinity for the target surface may be employed, such as pressure sensitive adhesives with different levels of adhesive tack.

One illustrative approach to substance selection would be to provide multiple substances which differ in properties (differ in degree of a common property or exhibit differing properties) and/or composition in protrusions which deform in multiple sequential stages of activation. For example, protrusions designed to deform and become more two-dimensional at a first level of activation may contain (or be surrounded by) a first substance, while protrusions designed to deform and become more two-dimensional at a second level of activation may contain (or be surrounded by) a second substance, etc. One illustration of such a material would be a sheet material which includes a slightly-tacky pressure sensitive adhesive in or around the first protrusions to deform and a more aggressive pressure sensitive adhesive in or around protrusions designed to deform in a later stage of activation. Such a material could thus provide a small initial adherent force which would releasably secure the sheet material to a target surface for proper positioning before activation of the more aggressive (and perhaps more permanent) adhesive in a subsequent activation stage.

Figure 13:
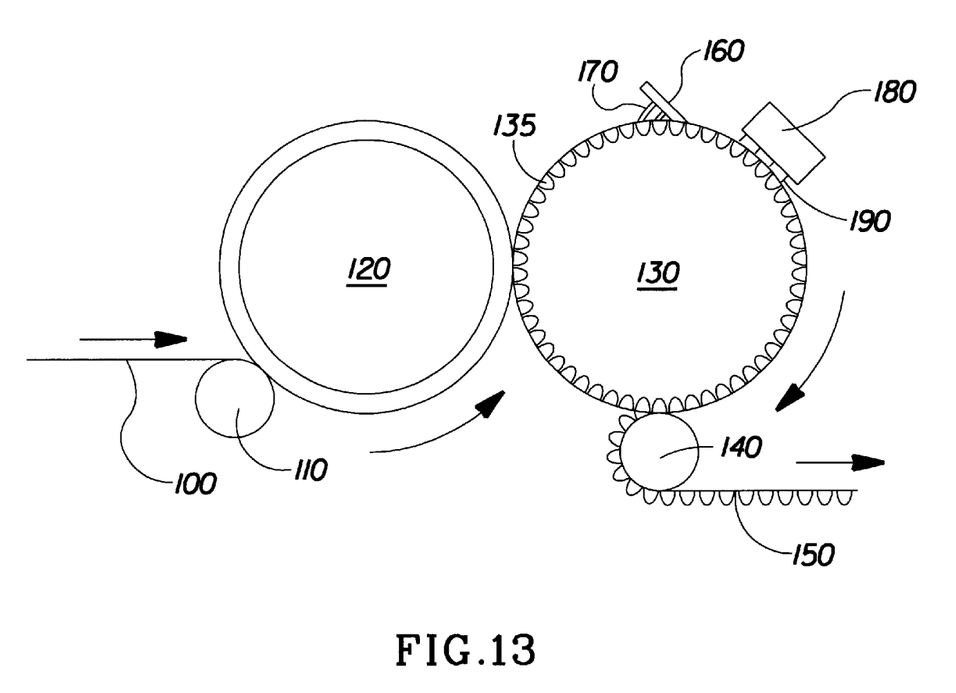
FIG. 13 is a simplified schematic illustration of a presently preferred process and apparatus suitable for manufacturing sheet materials in accordance with the present invention.

FIG. 13 depicts a presently preferred method of forming a sheet material according to the present invention. A shown in FIG. 12, a deformable material 100 is continuously supplied and fed onto a conformable rubber backing roll 120 via feed roll 110. Backing roll 120 draws the deformable material 100 into a nip between the backing roll and a rigid pattern roll 130. In the embodiment shown, which is suitable for manufacturing a sheet material having a plurality of protrusions containing a substance, the pattern roll 130 contains a plurality of recesses 135. The force exerted by the backing roll on the deformable material which overlies the pattern roll forces the deformable material into the recesses 135, thereby forming a plurality of corresponding hollow protrusions. The pattern roll may be manufactured by any means known in the art, including casting, etching, plating, mechanical engraving, etc. to incorporate the recesses of the desired depth and cross-sectional shape to manufacture the desired three-dimensional sheet material.

A doctor blade or squeegee 160 with an accompanying pool of substance 170 meters the substance into the depressions in the hollow side of the protrusions as shown in FIG. 3, for example. A conformable blade is useful in ensuring that the substance in the finished sheet material is in the protected location below the outermost surfaces of the sheet material. Another variation of this process could utilize a conformable roll in place of a stationary blade to fill the depressions with the substance. Substances could be supplied at differing levels within depressions by utilizing profiled and/or varying conformability doctor blades or nip rollers. Alternatively, or additionally if desired, an "ink jet" type substance injection delivery system 180 (pressurized nozzle array comprising a plurality of pressurized nozzles) can be utilized to deposit a spot of substance 190 into the depression of each hollow protrusion. Although registration is required between substance injection system 180 and the hollow protrusions, system 180 may be registered directly from the recesses 135 in pattern roll 130, which define the location of the protrusions. Differing levels of substances could be supplied via different injection volumes. Formed material 150 is thereafter discharged around a discharge idler roll 140.

Other manufacturing processes could be utilized, including those in which a male-type pattern roll replaces the female-type pattern roll depicted in FIG. 13 with its accompanying recesses to form sheet materials such as shown in FIG. 10. Such alternative processes include those described in greater detail in the above-referenced and incorporated U.S. patent application Ser. No. 08/744,850, filed Nov. 8, 1996 in the names of Hamilton and McGuire entitled "Material Having A Substance Protected by Deformable Standoffs and Method of Making", as well as other processes known in the art including the use of fluid pressure (gas/liquid) differentials as alternatives to mechanical embossing.

Any other suitable method of manufacture which delivers satisfactory results for the given substance and sheet material utilized may be employed, including but not limited to manual methods of uniting the substance and sheet material. One such alternative would be a method similar to that of FIG. 13, but wherein the incoming sheet of material is extruded onto the backing roll 120 rather than being pre-existing as a web of material. Other alternatives would include other means of exerting forces upon the deformable material to form the three-dimensional structure, including pressurized fluids (liquids and gases), thermal energy, etc.

Deformation mode and force can be influenced by the sidewall thickness profile to provide more desired results. A protrusion's sidewall connects the outermost portion of the protrusion to the unformed material adjacent to the base perimeter of the protrusion. The sidewall as defined may also contain a peripheral region substantially within the outermost portion which is substantially thinner than the interior region of the outermost portion. Protrusions where at least a portion of the sidewalls are substantially thinner than the unformed material adjacent to the base perimeter are believed preferred for deformation by the user. Sidewalls that are also substantially thinner in at least a portion of the sidewall as compared to the material at the outermost portion of the protrusion also beneficially bias the deformation to occur primarily within the sidewall structure.

In structures containing relatively small protrusions, as found in high number density protrusion patterns, such thinner sidewall gauges can be particularly useful.

Methods of production can influence the sidewall thickness profile such as in the use of a forming screen with essentially straight screen walls which define the forming screen hole. Such a process allows for substantially thinner sidewall thickness since the protrusion is freely drawn from the base perimeter into the forming screen recess to the point of contact with the internal backup screen. The internal backup screen's purpose is to prevent further drawing of the protrusion. This approach yields a more varied gauge profile within the sidewalls.

Micro-texturing the material during forming may also be useful, such as in producing a distinction between one side of the material and the other side. Micro-texturing of the outermost surface features of the three dimensional structure may be achieved in the present invention, for example, by drawing the piece of material into forming screen recesses and against a micro-textured surface, such as a vacuum drum having tiny apertures therein.

In general, the present invention is a three dimensional structure for holding a substance protected from inadvertent contact with external surfaces. The structure is convertible to a substantially two dimensional structure by applying a compressive force so that the structure collapses to release or expose the substance into contact with external surface(s). However, the scope of the invention also applies to three dimensional structures holding substances from inadvertent contact, which are converted to substantially two dimensional structures by means other than compression. For example, the inventors have found that a tensile force applied to the same three dimensional structure can cause it to plastically deform longitudinally and thereby contract in caliper or thickness to similarly expose or release substance. It is believed that under sufficient tension, the material between protrusions deforms in response to forces in the plane of the material and that protrusions are thereby elongated in the same direction. When the protrusions are elongated, they are reduced in height. With enough elongation the protrusions are reduced in height to where the substances between them, in them, or both are exposed.

A combination of compression and tensile forces may be applied to the material of the present invention in order to expose a substance from within the three dimensional structure. Although in a preferred embodiment of the present invention, the tensile force necessary to achieve sufficient deformation of said three dimensional structure in order to expose substance to an external surface is significantly greater than a compressive force to achieve the same result, a structure may be designed which is more easily deformed by a tensile force applied in a specific planar direction. For example, a structure may have parallel waves instead of protrusions and the waves may be easily flattened by stretching the structure perpendicular to the waves but in the plane of the waves. Other suitable tensile response structures are disclosed in U.S. Pat. No. 5,518,801 to Chappell et al. which is hereby incorporated herein by reference.

In another example, heat could be applied to cause the same structure made of shrinkable film to reduce in thickness to similarly release or expose the substance.

Examples of uses of the three dimensional structure of the present invention besides tapes, labels, and storage wraps include: lotion impregnated facial tissues, scented strips containing microencapsulated perfumes, adhesive impregnated shelf and wall paper, medicinal patches, patterned condiment delivery to a surface, two component adhesives, laundry pre-treating chemicals, abrasive delivery systems, and other applications where avoidance of contact with a substance held in a substrate is desired until some action is taken.

As described hereinafter, different substances can be deposited on the opposing faces of the formed material. Multiple substances can be located on the same face of the material either geometrically spaced from each other or commingled. Substances can be partially layered. An example is a layer of adhesive adjacent to the material surface with a solid particulate adhered to the exposed side of the adhesive layer. As discussed previously, multiple substances which are initially separated (on the same face of, or on opposing faces of, the sheet material) may be commingled during the activation process or during subsequent dispensing and/or dispersion operations.

A pattern of protrusions can be superimposed either on a similar dimensional scale or on a different dimensional scale such as a single or multiple "microprotrusion" pattern located on the tops of other larger protrusions.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A substance delivery system comprising:
   (a) a three-dimensional structure having outermost surface features and spaces between said outermost surface features for containing a substance, said substance having a level internal to said outermost surface features such that said substance is protected from inadvertent contact with external surfaces;
   (b) a substance, having substantial resistance to flow prior to delivery to a target surface, occupying said spaces of said three-dimensional structure, said substance remaining protected until said three-dimensional structure is sufficiently deformed into a substantially two-dimensional structure and said substance is thereby exposed to contact an external surface without compliance of said external surface being necessary;
   wherein said three-dimensional structure includes outermost surface features adapted to progressively activate in multiple discrete stages to effect mult-stage progressive delivery of said substance to a target surface.

2. The substance delivery system of claim 1, wherein said spaces are interconnected.

3. The substance delivery system of claim 1, wherein said spaces are discrete.

4. The substance delivery system of claim 1, wherein said outermost surface features are adapted to progressively activate in response to increasing compressive force levels.

5. The substance delivery system of claim 1, wherein said outermost surface features are adapted to progressively activate in response to increasing level of deformation.

6. The substance delivery system of claim 1, wherein said outermost surface features comprise hollow protrusions separated by valleys.

7. The substance delivery system of claim 1, wherein said outermost surface features exhibit differing geometrical heights.

8. The substance delivery system of claim 1, wherein said spaces include a plurality of diverse substances.

9. The substance delivery system of claim 1, wherein said outermost surface features exhibit differing geometrical cross-sectional shapes.

10. The substance delivery system of claim 1, wherein said substance occupies said spaces at different depths.

11. The substance delivery system of claim 1, wherein said three-dimensional structure is deformable by a compression force applied substantially perpendicular to a plane defined by said three-dimensional structure and wherein said outermost surface features of said three-dimensional structure deform in a direction substantially perpendicular to said plane.

12. The substance delivery system of claim 1, wherein said three-dimensional structure is deformable by a tensile force applied substantially parallel to a plane defined by said three-dimensional structure and wherein said outermost surface features of said three-dimensional structure deform in a direction substantially perpendicular to said plane.

13. A selectively-activatible sheet material for delivering a substance onto a target surface, said sheet material comprising:
   (a) a three-dimensional sheet of material having a first side and a second side, said first side having a plurality of hollow protrusions extending outwardly therefrom and separated from one another by valleys, said second side having a plurality of depressions corresponding with said plurality of hollow protrusions;
   (b) a substance adhering to and partially filling a location protected from external contact comprising at least one of said valleys and said depressions, such that said sheet material may be selectively activated by deforming said hollow protrusions to deliver said substance to a target surface;
   wherein said hollow protrusions are adapted to progressively activate in multiple discrete stages to effect mult-stage progressive delivery of said substance to a target surface.

14. A method of making a sheet material for delivering a substance onto a target surface, said method comprising the steps of:

(a) providing a sheet of deformable material;
(b) forming said sheet of material into a three-dimensional sheet of material having a first side and a second side, said first side having a plurality of hollow protrusions extending outwardly therefrom and separated from one another by valleys, said second side having a plurality of depressions corresponding with said plurality of hollow protrusions, said protrusions being adapted to progressively activate in multiple discrete stages;
(c) supplying a substance adhering to and partially filling a location protected from external contact comprising at least one of said valleys and said depressions, such that said sheet material may be selectively activated by deforming said hollow protrusions to deliver said substance to a target surface.

15. The method of claim 14, wherein said substance is deposited in a substantially uniform fashion within said depressions.

16. The method of claim 14, wherein said substance is deposited in varying levels within said depressions.

17. The method of claim 14, wherein said forming step comprises a mechanical embossing step.

18. The method of claim 14, wherein said forming step comprises applying a fluid pressure differential across said material.

19. The method of claim 14, wherein said hollow protrusions exhibit differing geometrical heights.

20. The method of claim 14, wherein said hollow protrusions exhibit differing geometrical cross-sectional shapes.

* * * * *